United States Patent [19]

Hugele

[11] Patent Number: 4,681,147
[45] Date of Patent: Jul. 21, 1987

[54] SAFETY DEVICE AND TIRE CONSTRUCTION FOR VEHICLES OR OTHER CONTRIVANCES

[75] Inventor: Benoit Hugele, Paris, France
[73] Assignee: Hutchinson S.A., Paris, France
[21] Appl. No.: 801,515
[22] Filed: Nov. 26, 1985

Related U.S. Application Data

[63] Continuation of Ser. No. 528,797, Sep. 2, 1983, abandoned.

[30] Foreign Application Priority Data

Sep. 2, 1982 [FR] France .................. 82 14998

[51] Int. Cl.$^4$ .................. B60C 17/04; B60C 17/10
[52] U.S. Cl. .................. 152/158; 152/520; 152/521
[58] Field of Search ............... 152/152, 158, 516, 520, 152/521

[56] References Cited

U.S. PATENT DOCUMENTS

| | | | |
|---|---|---|---|
| 3,250,310 | 5/1966 | Johnson | 152/158 |
| 3,485,283 | 12/1969 | Brehmer et al. | 152/158 |
| 3,857,427 | 12/1974 | Soucek | 152/158 |
| 4,177,849 | 12/1979 | Osada et al. | 152/330 RF |
| 4,265,290 | 5/1981 | Jackson | 152/330 RF |
| 4,318,435 | 3/1982 | Heath-Coleman | 152/158 |
| 4,327,791 | 5/1982 | Strader | 152/520 |
| 4,372,365 | 2/1983 | Osada et al. | 152/158 |

FOREIGN PATENT DOCUMENTS

| | | | |
|---|---|---|---|
| 101026 | 5/1937 | Australia | 152/158 |
| 1596932 | 6/1970 | France | |
| 2396664 | 7/1978 | France | |
| 2022032 | 12/1979 | United Kingdom | |
| 2072594 | 10/1981 | United Kingdom | |

Primary Examiner—Donald E. Czaja
Assistant Examiner—Ramon R. Hoch
Attorney, Agent, or Firm—Oblon, Fisher, Spivak, McClelland & Maier

[57] ABSTRACT

A safety device and a tubeless tire construction comprising a tubeless tire having beads the thickness of which is equal to e and an integral height H and a safety ring supported by a rim having a width equal to L. The dimensional relationships between the safety device and the tubeless tire are calculated so that:
the width L' at the top of the safety ring is such that:

$$L - 3e \leq L' \leq L - e,$$

and
the height H' of the safety device is such that:

$$\frac{H}{2} + 5\% \leq H' \leq \frac{H}{2} + 20\%,$$

the rigidity R of the safety ring is such that:

$$750 \text{ Kg/cm} \leq R \leq 1050 \text{ Kg/cm},$$

and the weight of the safety ring, expressed as a percentage of the weight of the tire, and its SHORE A hardness correspond so that, when the latter is between 70 and 80, the weight is between 60% and 70% of the weight of the tire.

4 Claims, 31 Drawing Figures

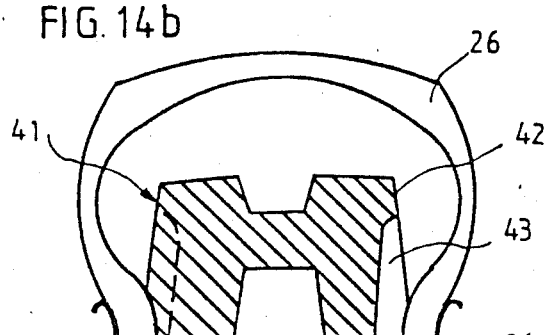
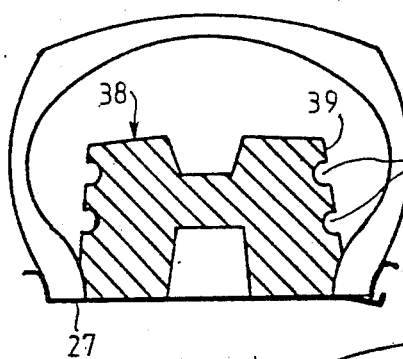
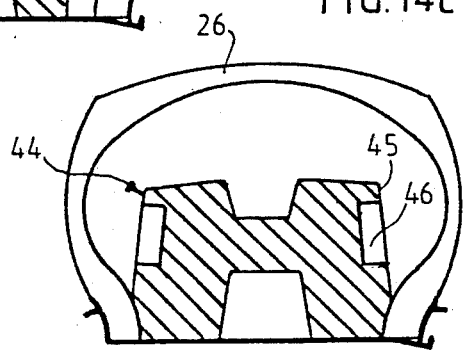
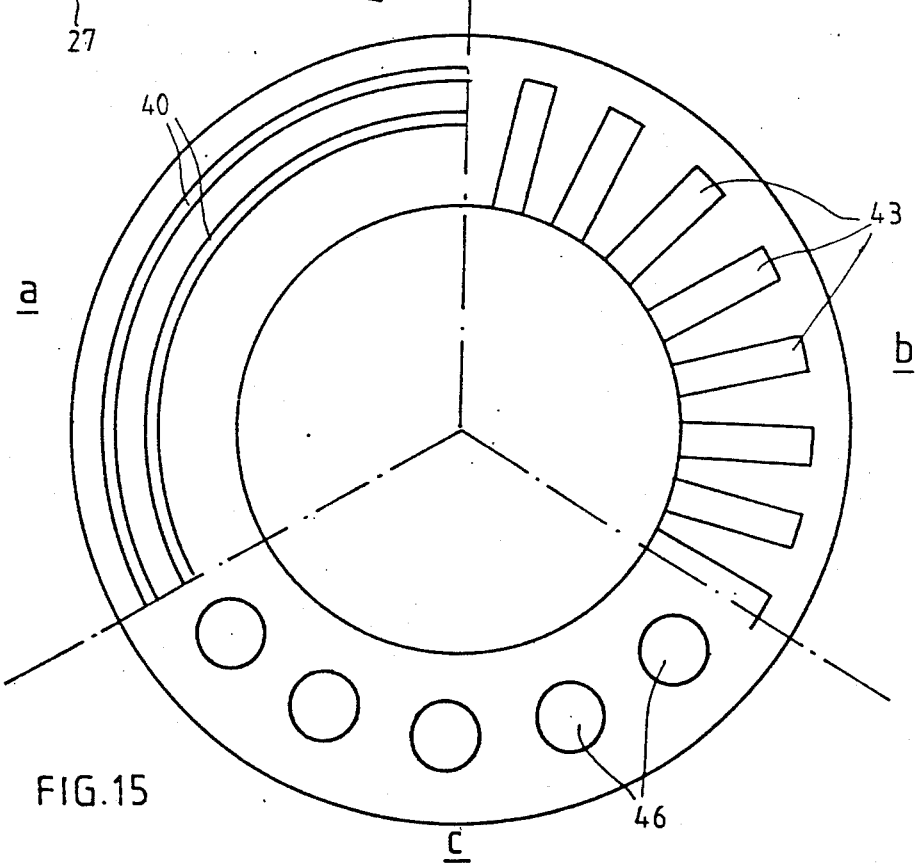

SAFETY DEVICE AND TIRE CONSTRUCTION FOR VEHICLES OR OTHER CONTRIVANCES

This application is a continuation of application Ser. No. 528,797, filed Sept. 2, 1983, now abandoned.

BACKGROUND OF THE INVENTION

The present invention relates to a novel safety device for vehicle tires, particularly for tubeless tires, which enables, in the case of a flat, the preservation of all the characteristics of the tire, in particular its adherence and the driving stability of the vehicle, over a relatively long distance of at least 50 km which can be travelled at a reasonably high speed of 50 km/h.

Safety devices for vehicle tires are known in the Prior Art and are constituted by a rubber lining, generally annular, arranged in the pneumatic space of the casing to the tire, which has the purpose of maintaining the beads of the tire against the edges of the rim and to limit the collapse of the tire in the case of a flat.

In particular, French Pat. No. 2,419,188 describes a toroidal insertion part which is composed:

- of a toric core of cellular material or foam, particularly polyurethane or polyethylene,
- of a radially-wound tire cord around the toric core and preferably composed of steel cable, and
- of at least one support member for the load on the tire, formed by means of a tire cord, which is also composed preferably of a steel cable and which is wound circumferentially around the middle third of the outer surface of said toric core.

The preparation of this insertion part is done before its positioning in the tire.

When the tire is inflated, said insertion part has a substantially oval central and thick portion, comprised between the beads of the tire and two thin end portions extending along approximately half its sides, so that, in the deflated position, said central portion supports the tread of the tire and the corresponding load, whilst the lateral portions support these side walls.

A protection against deflation is also known (see French Pat. No. 2,396,664) constituted by an annular element of elastic material, in particular of natural or synthetic rubber, which has a symetrical cross section with respect to the longitudinal median plane, particularly of H shape, composed of two spaced facing sidewalls and connected by an annular bridge (all around of which are arranged vents) which thus define annular grooves at the upper portion and at the lower portion of the annular element.

This elastic ring cooperates with an annular obturation bead, which is composed of a plurality of rigid obturation elements, freely articulated in the radial direction, and which is consequently not flexible laterally. This obturation bead is arranged in the groove formed at the lower portion of the ring so as to clamp these sides and the beads of the tire, thus rigidifying this ring.

However, these known safety devices have all the common disadvantage of unacceptably increasing the weight of the tire, on account of their cooperation with heavy reinforcement means, and the necessity of always requiring special tooling for their mounting.

In addition the minimum guaranteed distance that the tire can cover after puncture and the average speed at which it is possible to drive the vehicle under these conditions are not specified in the known publications; and in particular, the latter do not state physical parameters, particularly the weight, the bulk, and the rigidity of the safety devices, ensuring rolling, in the case of a flat, over a guaranteed minimum distance at a certain average speed.

In addition, the too great rigidity of the majority of known safety devices, due to the cooperation of elements of different nature, which renders difficult the checking of its optimum value for various uses, results in a destabilization of driving, whereas those of these devices which are of flexible material, particularly alveolar, do not permit the mastery, under all conditions of driving, of performance after puncture and can cause loss of the tread of the tire due to the fact that they do not ensure sufficient control of the collapse of the tire.

It is an object of the present invention to provide a safety device for vehicle tires which responds better to the necessities of practice than the devices intended for the same purpose known previously, particularly:

- in that its weight, its geometry and its rigidity, as well as the SHORE A hardness of the elastomer from which the toric ring of the device is composed, are defined with great accuracy as a function of all types of tubeless tires, from the passenger tire to the truck tire;
- in that it can be introduced into the tire not only by means of specially-designed machines for this purpose, but also manually, in accordance with certain features of the invention, which permits any recourse to special tooling to be avoided, thus simplifying the operations of mounting the safety device and reducing the cost;
- in that it ensures, both before and after the flat, a driving safety which is satisfactory without destabilization of the vehicle, in any driving conditions whatever, and
- in that its design is such that it renders practically impossible, after a puncture, the loss of the tread.

GENERAL DESCRIPTION OF THE INVENTION

According to the present invention there is provided a safety device for vehicle tires, particularly for tubeless tires, of the type comprising:

- a toric safety ring, particularly of elastomer or plastomer, whose cross-section has a symmetrical configuration, with respect to a longitudinal median plane, obtained by circumferentially forming an annular groove at the lower portion and at the upper portion of said ring particularly;
- at least one inextensible member circumferentially engirdling a portion of the upper surface of the toric ring;
- a predetermined amount of lubricant interposed between the safety device and the tire, wherein said safety device is characterised in that the dimensions of the toric safety ring are calculated so as to ensure a sufficient internal contact between the tire and the upper portion of the device, to limit the range of movement of the tire and to ensure the safety of driving under any driving conditions whatever, in the case of a flat, and to give the device a height calculated, with respect to the internal height of the tire, to avoid a considerable collapse of the tire, and the risk of loss of the tread of the latter, particularly in that:

the width $L'$ at the top of the ring is such that:

$$L - 3e \leq L' \leq L - e,$$

where
L = width of the rim
e = thickness of the bead of the tire and
the height H' of the device is such that:

$$\frac{H}{2} + 5\% \leq H' \leq \frac{H}{2} + 20\%,$$

where
H = internal height of the tire,
in that its rigidity R is such that:

750 kg/cm ≤ R ≤ 1050 kg/cm, and in that its weight expressed as a percentage of the weight of the tire, and its SHORE A hardness correspond so that, when the latter is comprised between 70 and 80, the weight is comprised between 60 and 70% of the weight of the tire.

According to an advantageous embodiment of the safety device according to the invention, the toric ring includes at least one groove or recess, at its lower portion. According to another advantageous embodiment of the safety device according to the invention, said toric ring comprises at least one groove or recess at its upper portion.

According to yet another advantageous embodiment of the safety device according to the invention, said toric ring comprises at least one groove or recess both at the upper portion and at the lower portion.

According to a preferred embodiment of the safety device according to the invention, the latter comprises at least one radial cut, which, in combination with the elasticity of the elastomer or of the plastomer which constitutes the ring, permits the deformation of the latter so as to allow it to penetrate manually, by rotation similar to screwing, into the tire, and the toric ring may or may not cooperate, according as the dimensions of the device are small, medium, or large, respectively, with at least one inextensible locking member for the ring on said rim and is positioned in at least said groove formed at the upper portion of said device.

According to another preferred embodiment of the safety device according to the invention, the locking member is constituted by a strap of inextensible material which may be a closed belt or a strap equipped with a closure device of the buckle type or with a self-gripping clip.

According to another preferred embodiment of the safety device according to the invention, the locking member is constituted by at least one locking pin.

According to the invention, the locking member is constituted by a strap of inextensible material which cooperates with at least one pin for locking at the toric ring, said strap being of a suitable material ensuring suitable strength on heating resulting from the internal friction on rolling after a flat and ensuring sufficient tensile strength, at least equivalent to that of a device not including a radial cut.

According to yet another advantageous embodiment of the safety device according to the invention, the upper surface of the ring is provided with an anti-friction layer of any suitable material, such as special elastomers or plastomers, plastics or metallic material, having good anti-friction characteristics, which anti-friction layer is fixed unremovably on said upper surface by any suitable means such as glueing, vulcanisation, positioning in the one or more upper grooves and clamping by means of the above-said locking belts or the like.

According to yet another advantageous embodiment of the safety device according to the invention, the lower surface of the toric ring comprises, on each side of the plane of symmetry, a conicity projecting with respect to the horizontal.

According to yet another advantageous feature of the invention, the safety device can include a bead reinforced by any suitable means such as bead-cores of elastomer or plastomer of greater hardness than the body of the device, for the double purpose of limiting the internal elongation of the internal diameter of the device to 5% at the maximum, with respect to the developed length and, under a tensile stress of 10 daN/cm$^2$ and of exerting simultaneously, on the rim and on the beads of the tire, a supporting pressure ensuring good gripping, equivalent to a normal pressure of use before the puncture.

According to another advantageous feature of the invention, the predetermined amount of lubricant interposed between the device according to the invention and the tire at the time of mounting is a function of the load of the tire and is preferably comprised between 6 and 20% in grams with respect to the load on the tire in kg.

According to another advantageous embodiment of the safety device according to the invention, the side walls of the ring comprise additional recesses adapted to reduce still further the weight of said device.

It is also an object of the present invention to provide a method of mounting the safety device according to the invention in a tire, preferably in a tubeless tire, characterised in that, in the case where the safety ring comprises a radial cut, it consists of introducing said toric ring, of elastomer or of elastic and deformable plastomer and having said radial cut, into a tire, by deformation of the ring by screw-wise rotation to cause it to penetrate into the tire, blocking the ring which has taken up again its toric shape after its introduction into the tire, in said toric form, by means of at least one inextensible blocking member, by positioning said member in a corresponding housing provided on the ring to receive said member.

According to a preferred embodiment of the methods of mounting according to the invention, the final blocking of the ring in its toric form in the tire is ensured by at least one inextensible strap which is positioned in a corresponding housing provided on the ring.

According to an advantageous feature of this embodiment, the inextensible strap is constituted by an endless belt which forms a closed ring.

According to another advantageous feature of this embodiment, the inextensible strap is constituted by a belt having a suitable length, provided with a closure device of the buckle or self-gripping clip type.

The present invention is aimed more particularly at safety devices for vehicle tires in accordance with the foregoing features, as well as means suited to their construction, vehicle tires equipped with such safety devices and vehicles equipped with tires comprising the safety devices according to the invention.

Besides the foregoing features, the invention comprises yet other features, which will emerge from the description which follows.

The invention will be better understood by means of the additional description which follows with reference to the accompanying drawings, given purely by way of non-limiting illustration.

BRIEF DESCRIPTION OF THE DRAWINGS

In the drawings:

FIG. 2 is a transverse sectional view of an embodiment of the safety device which does not include radial cuts, in accordance with the invention.

FIGS. 3 to 7 are transverse sectional views of other embodiments of the safety device which may or may not include a radial cut, in accordance with the invention and co-operate through this reason with at least one inextensible load member arranged in at least one groove formed at the lower portion; in particular, FIGS. 3a to 7a are sectional views of said device before the mounting of the tire, whilst FIGS. 3b to 7b, are views in section of this device mounted on the rim in the tire, and co-operating with said blocking member in the case where it is provided with said radial cut.

FIG. 14 shows three modificiations of embodiments (a,b,c) with additional lightening of the safety device according to the invention, in cross-section, whilst FIG. 15 is a longitudinal sectional view of these three modified embodiments.

It must be well understood, however, that these drawings and the corresponding descriptive portions, are given purely by way of illustration of the invention, of which they do not constitute in any way a limitation thereof.

The safety device for a vehicle tire according to the invention is constituted by a toric ring having sizes which, in combination with other features, namely its rigidity, its weight, expressed as a percentage of the weight of tire, and its SHORE A hardness, ensure a limited collapse of the tire, in the case of a flat, under conditions which enable rolling with one or two flat tires, and, consequently, deflated, over relatively large distances, without loss of the tread of the tire, good adherence to the ground and real driving safety in all cases of perforation of the tire.

In particular, it is found that for safe driving to be ensured in all cases of perforation of the tire, over a minimum distance of 50 km and a speed of 50 km/h, and to avoid the tire losing its tread under such driving conditions, the safety device must have, in combination, the characteristics indicated below, which appear to constitute the critical conditions.

Figure 1:
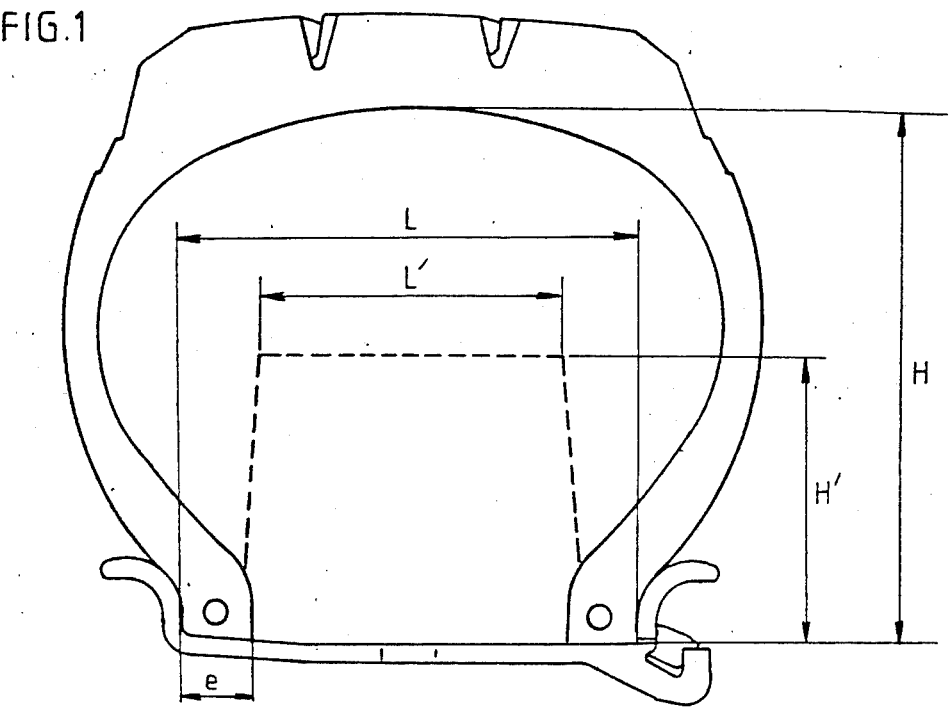
FIG. 1 represents schematically the dimensioning according to the invention, of the safety device with respect to the tire in which it is mounted.

Thus, the height of the safety device according to the invention, with respect to the internal height of the tire, must be such that (compare FIG. 1):

$$\frac{H}{2} + 5\% \leq H' \leq \frac{H}{2} + 20\%,$$

where H is the internal height and H' the height of the safety device.

In the same way, the width at the top of the safety device according to the invention must occur in the following relationship, with respect to the width of the rim of the wheel and to the thickness of a bead of the tire (cf. FIG. 1):

$$L - 3e \leq L' \leq L - e,$$

where L is the width of the rim, e the thickness of a bead and L' the width of the top of the safety device.

Such dimensional characteristics have the effect of preventing the tire from collapsing by more than half its internal height and they have the effect of limiting the shifting of the tire, which permits good road holding of the vehicle to be ensured on curves, even with tires deflated by perforation.

It is on the other hand found that a vehicle equipped with tires provided with safety devices known from the prior art, is difficult to steer by reason of the too great rigidity of the latter. Research carried out by Applicant to eliminate this too great a rigidity, prejudical to the safety of steering and driving, has led to determining that the rigidity R of the safety device according to the invention—that is to say the value of the slope of the "load" curve (expressed in kg) as a function of the "crushing underload" (expressed in cm)—must be such that:

$$750 \leq R \leq 1050 \text{ kg/cm},$$

which signifies that the safety device must be semi-rigid, either by forming it of a compact flexible material, or/and by creating flexion zones in the device, as is the case by means of recesses or grooves included in the device according to the invention and which will be described below.

It is in addition advantageous to form the toric ring of an elastomer of which the SHORE A hardness is comprised between 70 and 80 when the weight of the safety device according to the invention is comprised between:

$$0.6 \times P \leqq P' \leqq 0.7 P$$

where P is the weight of the tire and P' the weight of the safety device.

The limitation in the weight of the safety device, according to the invention, to 60-70% of the weight of the tire has the result of removing the risk of imbalance when the tire is used in the deflated state, which risk is encountered with the majority of safety devices known in the prior art.

The safety device for vehicle tires according to the present invention may, by reason of the characteristics and dimensions and rigidity, as well as of the weight and hardness which have just been mentioned, be adapted to any type of "tubeless" tire whatever, from the passenger car tire to the truck tire, which constitutes a considerable advantage since its use can thus extend throughout the range of vehicles, whether it relates to passenger automobiles, heavy trucks, tractors or even armoured vehicles for military use.

DESCRIPTION OF PREFERRED EMBODIMENTS

Figure 2A:
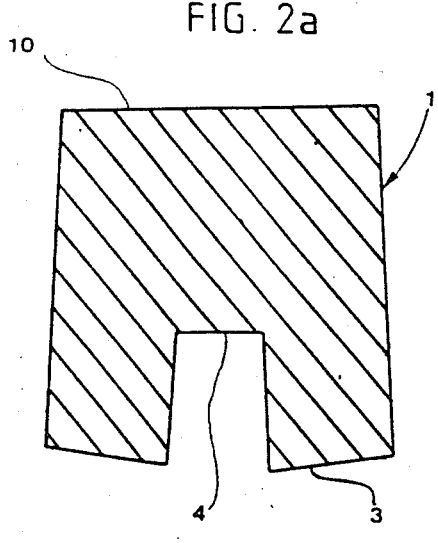
FIGS. 2a and 2b show two possible forms and at least one groove or recess, formed at its lower portion.
Figure 2B:
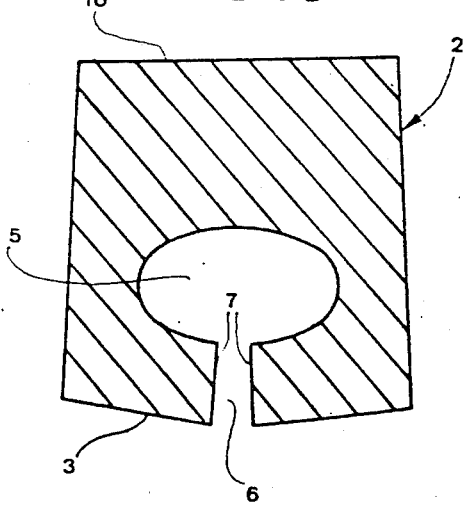

The toric rings 1 and 2 shown in FIGS. 2a and 2b are provided at the lower portion 3, with a groove 4, having a substantially inverted U shape, and with a recess which has substantially the shape of a key hole, respectively. The recess in the FIG. 2b embodiment is constituted by a portion 5 in the form of a bubble, associated with an open slot 6. It is advantageous to make the wall 7 of this slot 6 bevelled to define a passage for introducing inflating air, according to the modalities which will be described below (cf. description of FIGS. 16 and 17).

Figure 3B:
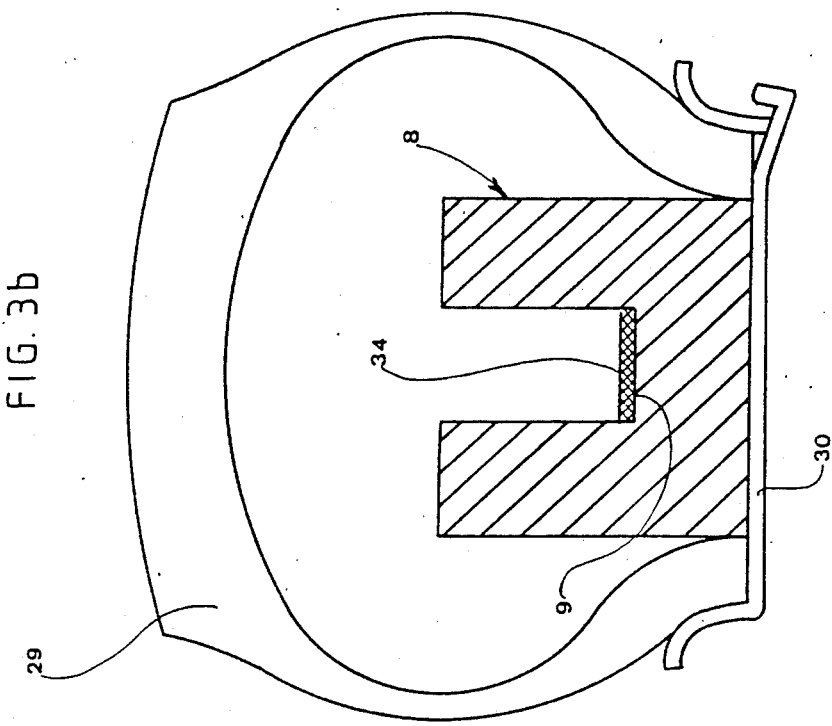
Figure 3A:
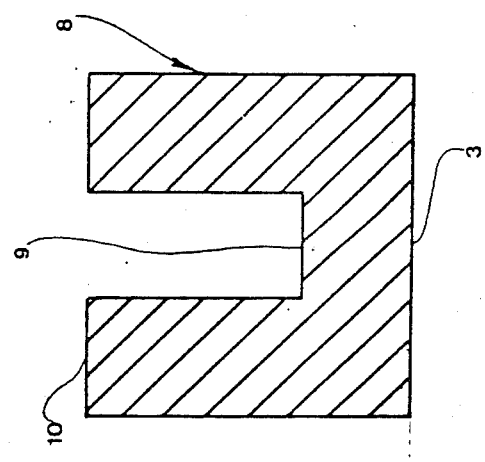
Figure 4B:
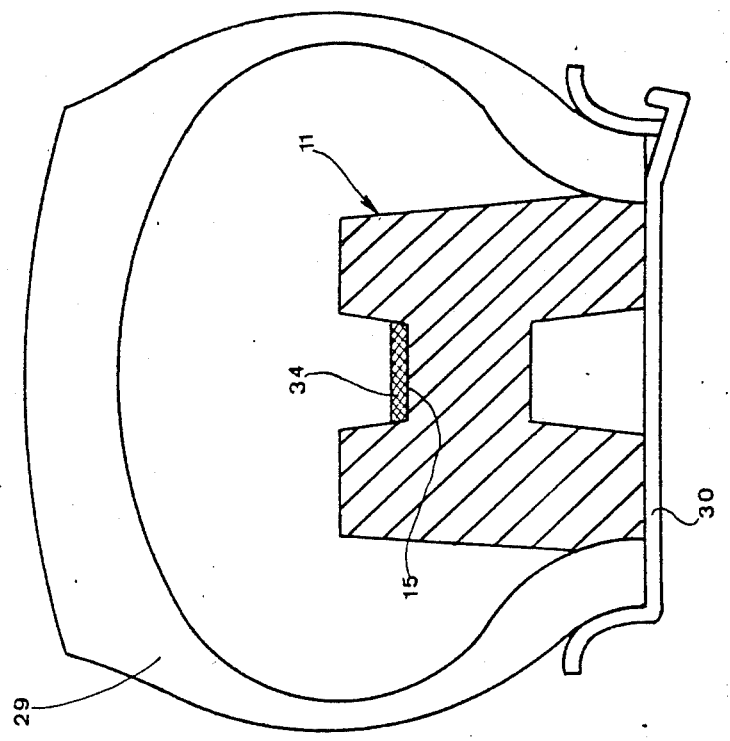
Figure 4A:
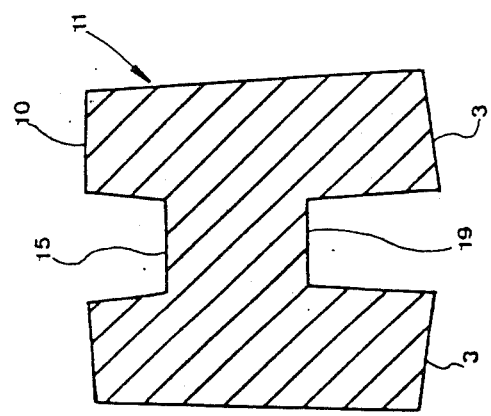
Figure 5B:
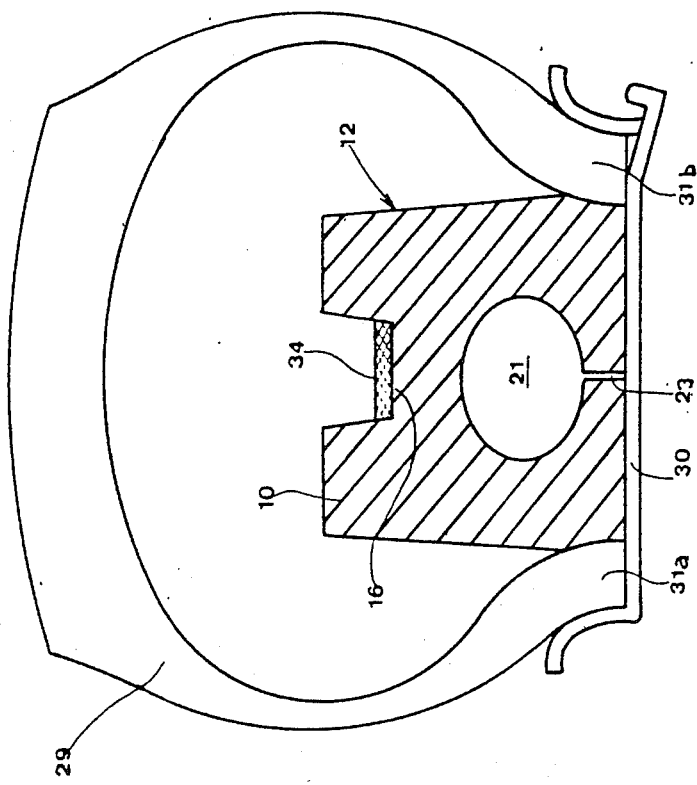
Figure 5A:
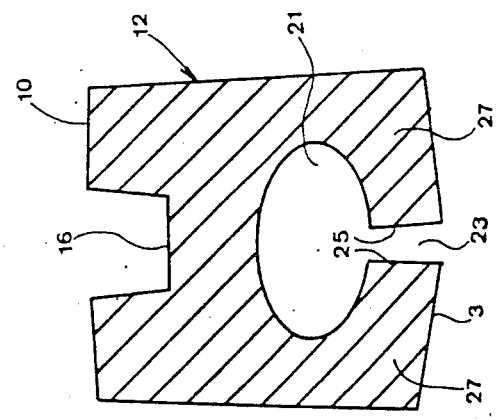

Toric ring 8, shown in FIG. 3a, is provided, differently from rings 1 and 2, with a groove 9, inserted at the upper portion 10 having a substantially U shape. FIGS. 4a to 7a show, in addition, rings 11, 12, 13, 14, provided at the same time at their upper portion 10 and at their lower portion 3 with at least one groove 15, 16, 17 and 18, substantially U shaped and respectively one groove 19, 20 substantially inverted U shaped, or a recess substantially in form of a key hole including, also in this case, a bubble 21, 22 and a slot 23, 24. What has been stated on the subject of the opportuness of bevelling the walls of the slot 6 of the recess of FIG. 2b remains valid also for the walls 25 and 26 of the slots 23 and 24 of the recesses of FIGS. 5 and 7. As regards FIGS. 2, 5 and 7, it should be noted that, in each case, the slot 6, 23, 24 is bounded by two beads 27 and 28 which after mounting the tire 29 on the rim 30 of the wheel of the vehicle, touch each other, which enables better grip of the beads 31a and 31b of the tire 29 on said rim 30.

In addition, the lower portion 3, of the toric rings 1, 2, 12, 13, 14 and 15 have a slight conicity of the order of 10°, with respect to the horizontal, to ensure the positive and non-removable grip of the beads 31a and 31b of the tire 29 after mounting the latter on the rim 30 of the wheel of the vehicle. In the embodiment shown in FIGS. 5 and 7, as well as in FIG. 2b, this gripping effect is reinforced by the gripping effect of the beads 31a and 31b on the tire 29 after mounting the latter on said rim 30 as is shown in FIGS. 4b to 7b.

As regards the embodiment shown in FIG. 3a which does not include the groove or recess at the lower portion 3 of the ring 8, the conicity of the latter is limited to a bevel (not shown) formed on the lower lateral edges of this ring 8.

Figure 8A:
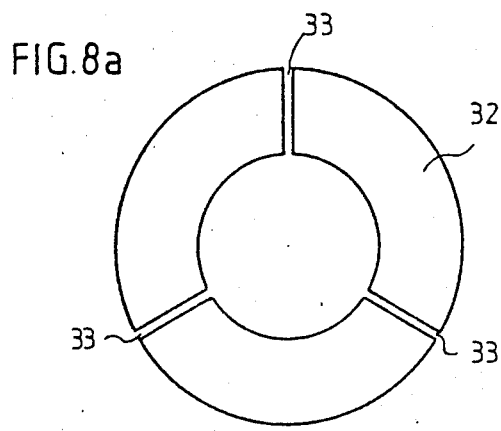
FIG. 8 is a longitudinal sectional view of three modifications of the embodiment of a toric ring comprised by the safety device according to the invention; the modification c shows a toric ring comprising a radial cut, whilst modification b shows a toric ring comprising two diametrically opposite radial cuts and modification a shows a toric ring comprising three radial cuts.
Figure 8B:
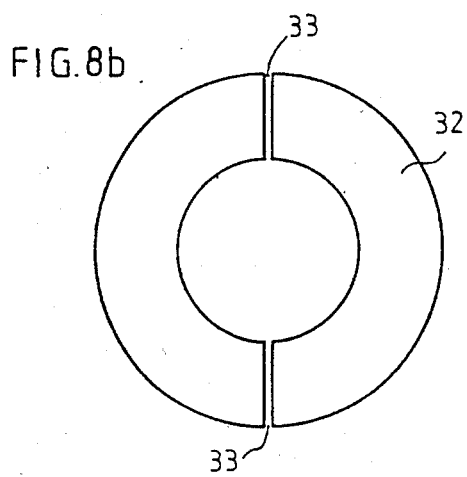
Figure 8C:
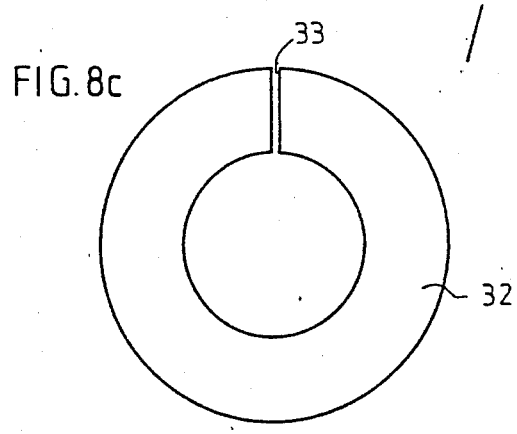

Although the embodiment without a groove at the upper portion, shown in FIGS. 2a and 2b, is intended to be mounted as such on the tire 29, whatever the embodiment including at least one upper groove (cf. FIGS. 3 to 7), the toric ring, which subsequently will be indicated generally by the reference 32 can include one or several radial cuts 33 (cf. FIGS. 8a, 8b, 8c), of which the role will be described below. In this cases, the upper grooves 9 (cf. FIG. 3), 15 (cf. FIG. 4), 16 (cf. FIG. 5), 17 (cf. FIG. 6) and 18 (cf. FIG. 7) are intended each to house (except if the sizes of the ring are small), a strap 34 formed of an inextensible material; these straps have the purpose of maintaining the toric ring definitely in shape in the tire 26 and to lock it in the latter after its introduction into said tire, by a process which will be described below.

Figure 11A:
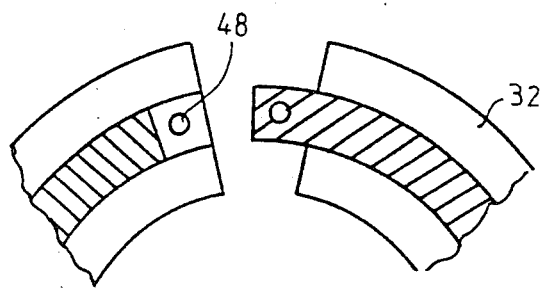
FIG. 11 is a partial view of a toric ring provided with a locking member constituted by a pin, FIG. 11a showing said locking member in longitudinal sectional view and FIG. 11b showing it in view from above.
Figure 11B:
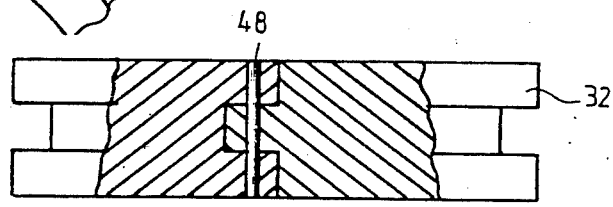
Figure 12A:
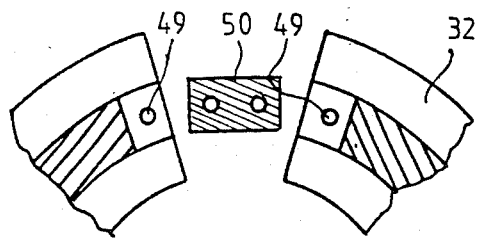
FIG. 12 is a drawing similar to that of FIG. 11, in which the toric ring is locked in shape by means of two pins, FIG. 12a being a longitudinal section and FIG. 12b a view from above.
Figure 12B:
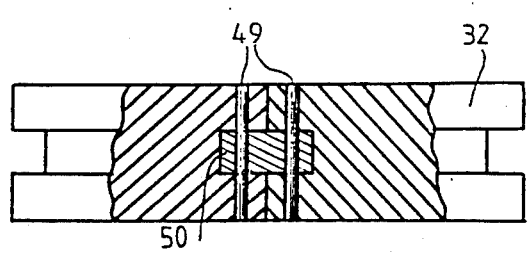

The locking of the toric ring 32 in position in the tire can also be carried out by other means, such as those shown in FIGS. 11 and 12.

FIG. 11 shows the locking of the toric ring in its toric form by means of a locking pin 48 mounted at the level of the one or more radial cuts 33, whereas FIG. 12 shows the locking of the toric ring 32 in its toric form by means of locking pins 49 with the interposition of a connecting part 50.

It may also be advantageous to combine the above-described locking means, by using for the locking of the toric ring, both a strap 34 and a locking pin 48 or a locking device comprising two pins 49 and a connecting part 50. It is self-evident that any other equivalent locking means may be used to maintain the toric ring in its toric shape in the tire, whilst remaining within the scope of the invention.

Figure 13B:
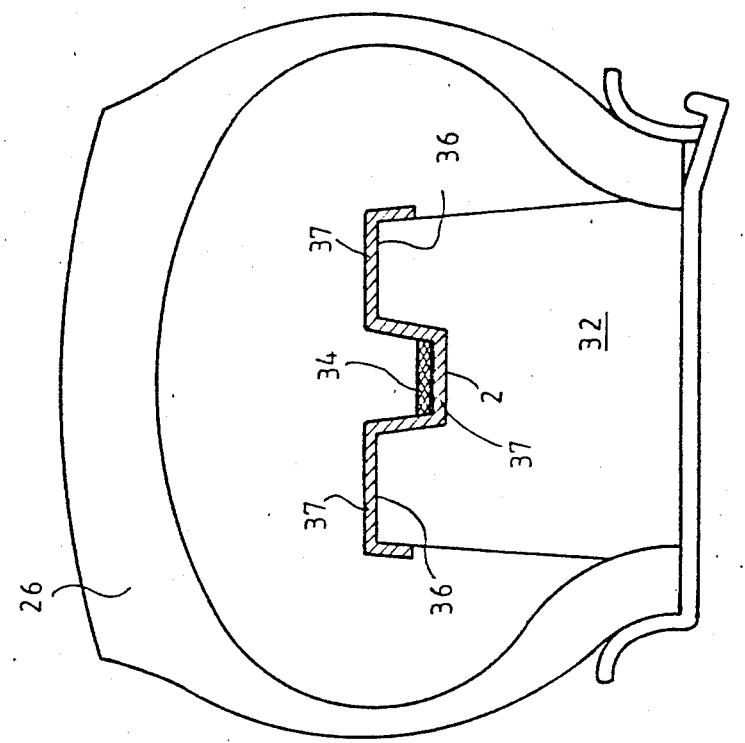
FIG. 13 is a view in cross-section of a safety device for a vehicle tire according to the invention mounted on the rim, provided on its upper surface with an anti-friction layer positioned according to two modifications a and b.
Figure 13A:
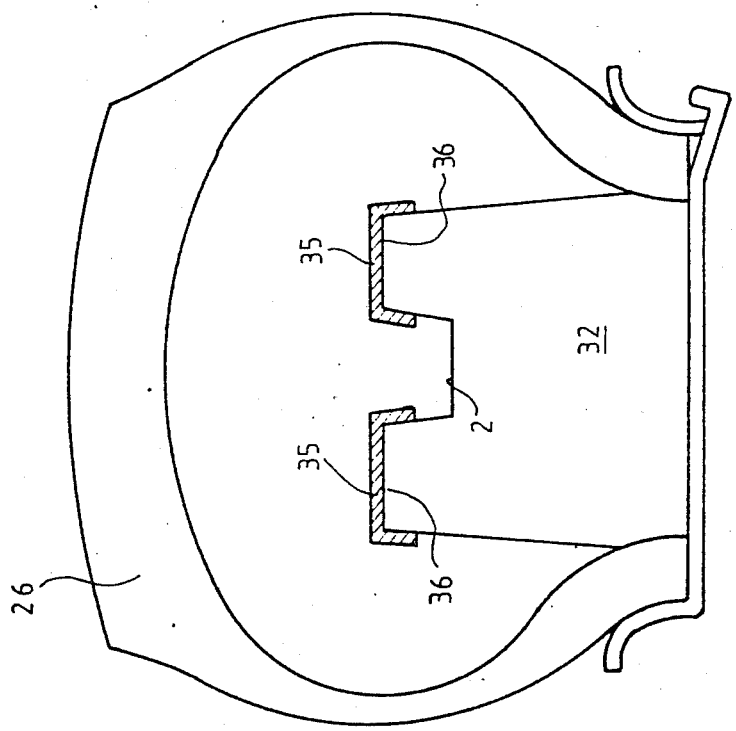

The upper surface of the toric ring may in addition advantageously be provided with an anti-friction coating reducing friction between this ring and the tire which may be of elastomer or special plastomer or of any other material having good anti-friction characteristics, such as plastics material (notably polytetrafluoroethylene) or metalic material, or again polytetrafluoroethylene bonded to a metal alloy. In accordance with FIG. 13a, an anti-friction coating 35 is fixed to the upper surface 36 of the toric ring 32 by any suitable means such as glueing or vulcanisation, for example. In accordance with FIG. 13b, the anti-friction coating 37 is applied not only to the upper surface 36 of the toric ring 32 but also to the bottom and the side walls of the groove 2 formed on said upper surface 36; the fixing of this coating 37 can be carried out by gluing or vulcanisation, but it can also be by gripping by means of the strap 34 housed in the groove 2.

As has been stated above, the grooves or recesses formed in the lower portion of the toric ring of the safety device according to the invention have essentially the role of lightening the weight of the safety device. It may be found advantageous to reduce still further the weight of the safety device; for this purpose, the lateral walls of the latter may include additional recesses having any suitable shape such as, for example, the form of longitudinal channels 40 formed in the lateral walls 39 of the toric ring 38 (cf. FIGS. 14a and 15a) or that of a radial slit 43 formed in the lateral walls 42 of the toric ring 41 (cf. FIGS. 14b and 15b)) or that of cylindrical channels 46 formed in the lateral walls 45 of the toric ring 44 (cf. FIGS. 14c and 15c).

In the case of a device not including a radial cut, it may be advantageous to reinforce the lower portion of the toric ring, in particular in those embodiments which include beads 29a and 29b (cf. FIGS. 5 and 7), or by forming said lower portion of a harder plastomer or burying here one or several wires. In fact, it is necessary for the elongation of the internal diameter of the safety device to be limited to 5% under a tensile stress of 10 daN/cm$^2$ and for the supporting pressure exerted by the safety device according to the invention simultaneously on the rim and on the beads of the tire to be equivalent to a normal pressure of utilisation before puncture, both in the case of a device comprising a radial cut and in the case of a device not including said radial cut. The need to respect these two conditions may hence lead to reinforcing the lower portion of the safety device as indicated above.

As has been mentioned above, the upper surface of the toric ring included by the safety device according to the invention may advantageously be provided with an anti-friction coating which has the effect of reducing the heating due to friction of the lower surface of the tire on the safety device according to the invention.

Another means adapted to reduce the heating due to the friction of the tire on the safety device, which may be used either alone, or conjointly with the arrangement of the anti-friction coating on the upper surface of the safety device, is constituted by the introduction of a certain amount of lubricant between the tire and the safety device, during the mounting operation of the latter in the tire. This lubricant is added in the proportion of an amount Q which is a function of the load on the tire and which is calculated by means of the following formula:

$$Q = \text{load on tire} \times 0.10$$

where the load is expressed in kg and the amount of lubricant in g.

It is advantageous to use a lubricant of which the viscosity is not less than 500 centipoises and is advantageously comprised between 500 and 800 centipoises. Among suitable lubricants useful within the scope of the invention, may be mentioned, by way of example, type 47 V 500 silicone oil.

Figure 9:
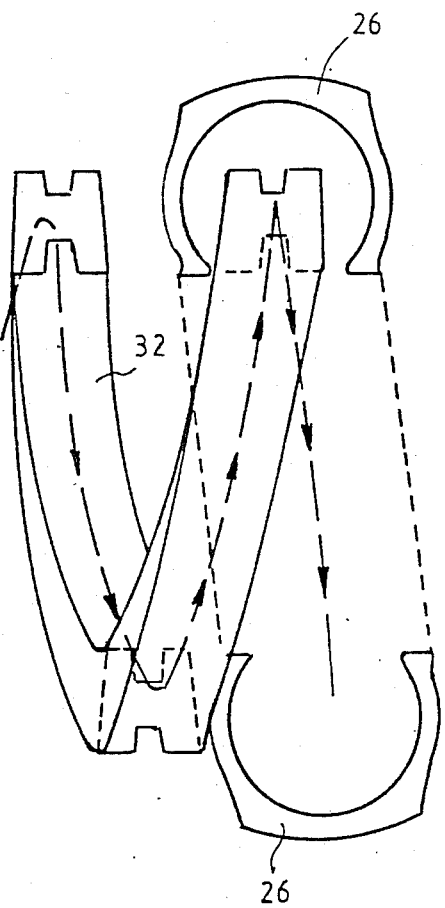
FIG. 9 shows diagrammatically the process of introducing a toric ring according to modification c of FIG. 8, into a "tubeless" tire casing.
Figure 10:
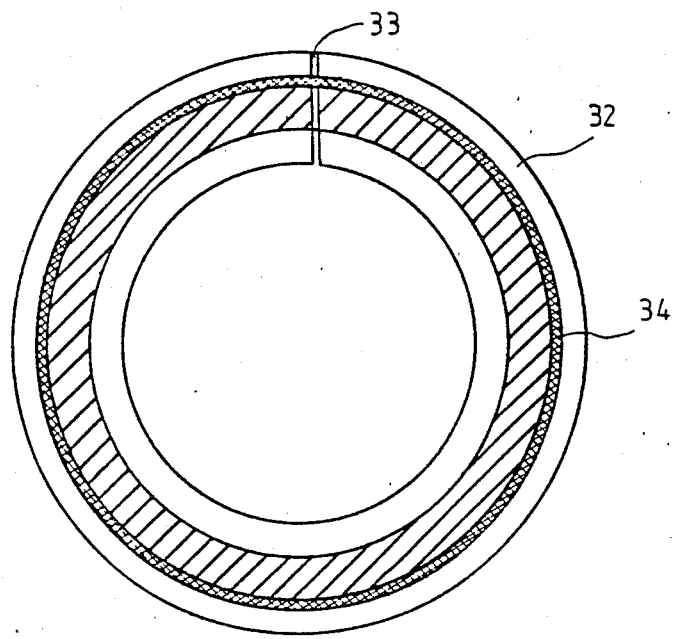
FIG. 10 is a longitudinal sectional view of a tire equipped with a safety device according to the invention, mounted on a rim and locked by means of a strap.

The safety device for a vehicle tire according to the present invention is introduced into the tire without necessitating recourse to a special and expensive mounting machine. In fact, the fact that the toric ring (cf. FIGS. 8a, 8b, 8c) includes, according to the invention, at least one radial cut, and the fact that it is formed of a relatively flexible and hence deformable elastic material, of the elastomer type mentioned above, enable its introduction into the tire 29 as shown in FIG. 9, by manually causing it to undergo a screw-wise rotation. After its introduction into the tire, the ring 32 resumes it toric shape. It is then locked in position in the tire, by placing in position one or several locking members which will be described below. The member for locking the toric ring in position in the tire may be constituted by one or several inextensible straps 34 introduced into housings provided for this purpose in the toric ring 32, as shown in FIGS. 4b to 7b and FIG. 10. Inextensible straps 34 used within the scope of the invention may be closed belts, that is to say endless, in which case the toric ring must be deformed by means of suitable handtool to enable the positioning of said belts in their housings. Straps 34 may also be used equipped with a closure device of the buckle or self-gripping clip type, in which case the operation of introducing the safety device into the tire is done manually without even having to resort to a handtool.

Figure 16:
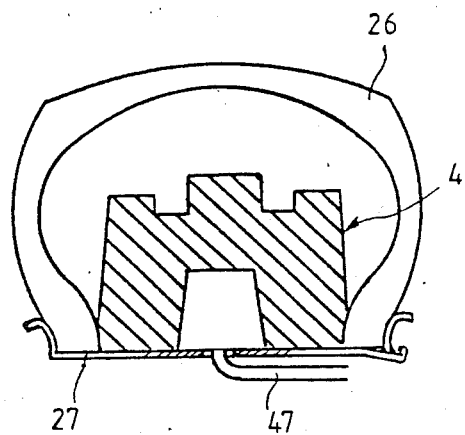
FIGS. 16 and 17 show, in cross-section, the mounting of the inflation valve in association with the safety device
Figure 17:
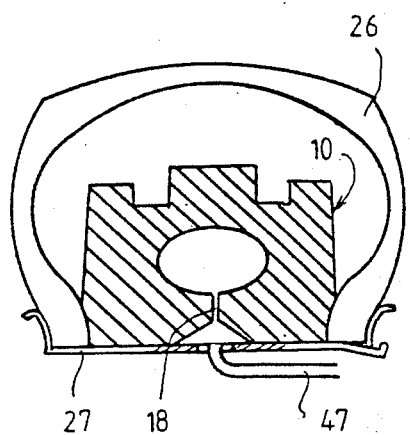
Figure 18:
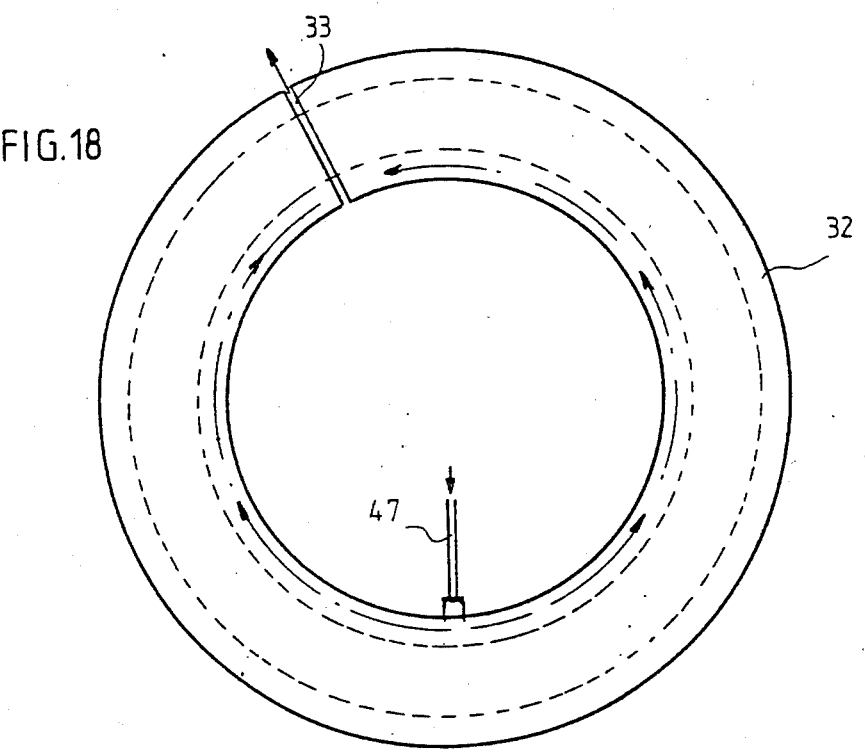
FIG. 18 shows a longitudinal section of the safety device according to the invention, showing the path of the inflating gas in the latter to ensure the inflation of the tire.

The safety device according to the invention, due to the radial cut 33 included in the toric ring which it comprises, has in addition the effect of facilitating inflation of the tire in which it is included, by better distribution of the inflating gas in the latter, as shown in FIGS. 16 to 18.

Figure 6B:
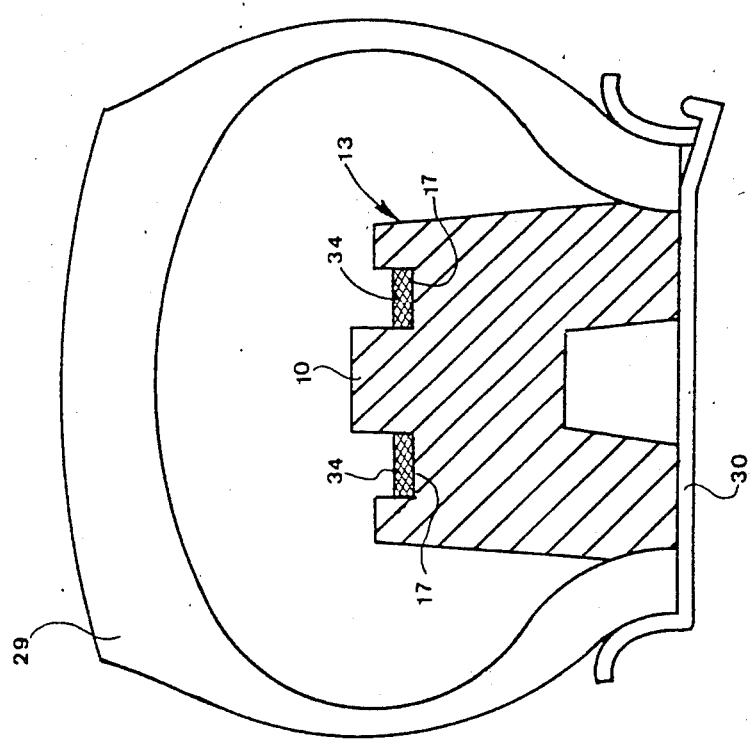
Figure 6A:
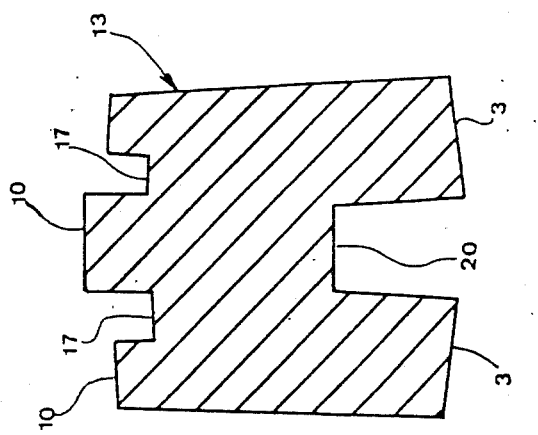
Figure 7B:
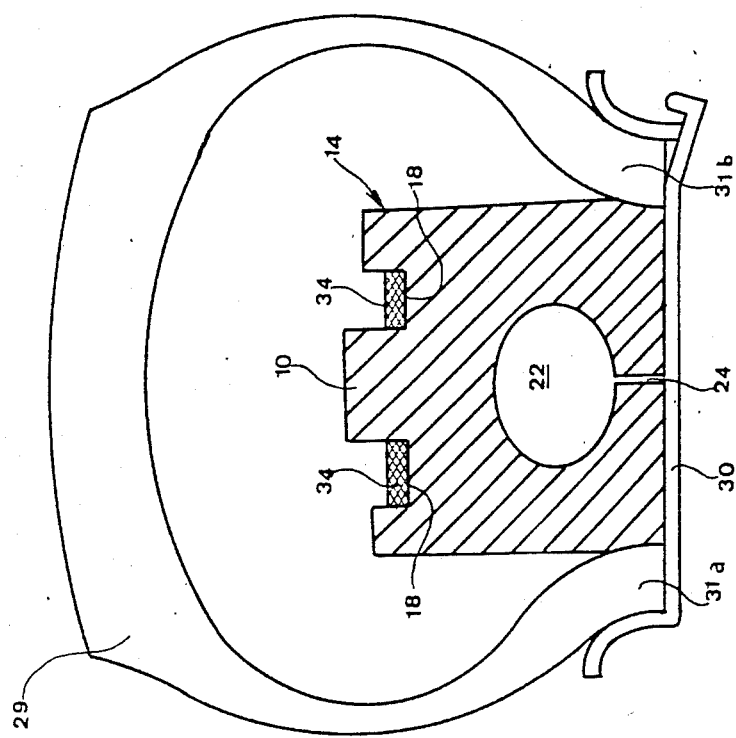
Figure 7A:
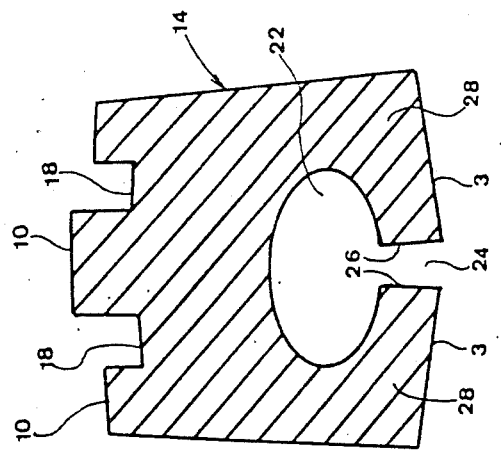

FIG. 16 shows the association of the inflating valve 47 with a safety device of the type of that shown in FIG. 6, whilst FIG. 17 shows the association of the inflating valves 47 with a safety device of the type shown in FIG. 7. The inflating gas introduced by means of the inflating valve 47 leads into the safety device 32 up to the radial cut 33 whence it escapes into the tire 29. The entry of the inflating gas into the device shown in FIG. 17 is facilitated by the bevelling of the walls of the lower groove formed in the toric ring which define a space during the passage of the inflating gas into the safety device.

It is self-evident that, in the case of the absence of said radial cut 33, the inflation of the tire 29 is done by any means known in itself, particularly by means of a channel which passes through the toric ring 32 in a manner described, for example, in French Pat. No. 82 00607 in name of Applicant. In the case of a simultaneous absence of a radial cut and of a lower groove, said traversing channel can co-operate advantageously with an annular groove formed on the periphery of the toric ring, as described in said French Pat. No. 82 00607.

As emerges from the foregoing, the invention is in no way limited to those of its modes of employment, embodiments and uses which have just been described more explicitly; it encompasses on the contrary all modifications which may come to the spirit of the technician skilled in the art, without departing from the scope, nor the extent, of the present invention.

I claim:

1. A safety device and a tubeless tire construction comprising:
   (a) a tubeless tire which is supported by a rim having a width equal to L, said tubeless tire having:
      (i) a tread;
      (ii) two side walls;
      (iii) two beads, the thickness of each of which is equal to e;
      (iv) an internal height H; and
      (v) a weight P;
   (b) a toric safety ring made of elastomer or plastomer, said toric safety ring having:
      (i) a rigidity R;
      (ii) a SHORE A hardness d;
      (iii) a weight P';
      (iv) a height H';
      (v) a lower portion and an upper portion; and
      (vi) a width L' at the top of the upper portion, the cross-section of said toric safety ring having a symmetrical configuration with respect to a longitudinal median plane of said tubeless tire;
   (c) reinforcement means comprising at least one bead core made of elastomer or plastomer of greater hardness than the body of the safety device, said reinforcement means being circumferentially embedded in the lower portion of said toric safety ring; and
   (d) a predetermined amount of lubricant interposed between said toric safety ring and said tubeless tire, wherein the dimensional relationships between said toric safety ring and said tubeless tire are calculated so as to ensure a sufficient internal contact width between said tubeless tire and the upper portion of the safety device to limit the shifting of said tubeless tire in the case of a flat and to give the device a height calculated, with respect to the internal height of said tubeless tire, to avoid a considerable collapse of said tubeless tire and the risk of losing the tread from said tubeless tire, particularly in that:

(e) the width L' is such that:

$$L - 3e \leq L' \leq L - e;$$

(f) the height H' is such that:

$$\frac{H}{2} + 5\% \leq H' \leq \frac{H}{2} + 20\%;$$

(g) the rigidity R is such that:

$$750 \text{ Kg/cm} \leq R \leq 1050 \text{ Kg/cm};$$

(h) the weight of the safety device is between 60% and 70% of the weight of said tubeless tire; and (i) the SHORE A hardness d is such that:

$$70 \leq d \leq 80.$$

2. A safety device and a tubeless vehicle tire construction comprising:
(a) a tubeless tire which is supported by a rim having a width equal to L, said tubeless tire having:
  (i) a tread;
  (ii) two side walls;
  (iii) two beads, the thickness of each of which is equal to e;
  (iv) an internal height H; and
  (v) a weight P;
(b) a toric ring made of elastomer or plastomer, said toric safety ring having:
  (i) a rigidity R;
  (ii) a SHORE A hardness d;
  (iii) a weight P';
  (iv) a height H';
  (v) a lower portion and an upper portion; and
  (vi) a width L' at the top of the upper portion,
  the cross-section of said toric safety ring having a symmetrical configuration with respect to a longitudinal median plane of said tubeless vehicle tire;
(c) reinforcement means comprising at least one bead core made of elastomer or plastomer of greater hardness than the body of the safety device, said reinforcement means being circumferentially embedded in the lower portion of said toric safety ring;
(d) at least one radial cut which, in combination with the elasticity of the elastomer or of the plastomer of which said toric safety ring is made, permits the deformation of said toric safety ring so as to allow it to penetrate manually, by rotation, into said tubeless vehicle tire;
(e) at least one inextensible locking member circumferentially engirdling a portion of the upper surface of said toric safety ring, said at least one inextensible locking member being circumferentially disposed on the radially outer surface of said toric safety ring, said at least one inextensible locking member being positioned in a groove formed in the upper portion of the safety device; and
(f) a predetermined amount of lubricant interposed between said toric safety ring and said tubeless vehicle tire, wherein the dimensional relationships between said toric safety ring and said tubeless vehicle tire are calculated so as to ensure a sufficient internal contact width between said tubeless vehicle tire and the upper portion of the safety device to limit the shifting of said tubeless vehicle tire in the case of a flat and to give the device a height calculated, with respect to the internal height of said tubeless vehicle tire, to avoid a considerable collapse of said tubeless vehicle tire and the risk of losing the tread from said tubeless vehicle tire, particularly in that:

(g) the width L' is such that:

$$L - 3e \leq L' \leq L - e;$$

(h) the height H' is such that:

$$\frac{H}{2} + 5\% \leq H' \leq \frac{H}{2} + 20\%;$$

(i) the rigidity R is such that:

$$750 \text{ Kg/cm} \leq R \leq 1050 \text{ Kg/cm};$$

(j) the weight of the safety device is between 60% and 70% of the weight of said tubeless vehicle tire; and (k) the SHORE A hardness d is such that:

$$70 \leq d \leq 80.$$

3. A safety device and a tubeless vehicle tire construction comprising:
(a) a tubeless vehicle tire which is supported by a rim having a width equal to L, said tubeless vehicle tire having:
  (i) a tread;
  (ii) two side walls;
  (iii) two beads, the thickness of each of which is equal to e;
  (iv) an internal height H; and
  (v) a weight P;
(b) a toric safety ring made of elastomer or plastomer, said toric safety ring having:
  (i) a rigidity R;
  (ii) a SHORE A hardness d;
  (iii) a weight P';
  (iv) a height H';
  (v) a lower portion and an upper portion; and
  (vi) a width L' at the top of the upper portion,
  the cross-section of said toric safety ring having a symmetrical configuration with respect to a longitudinal median plane of said tubeless vehicle tire;
(c) reinforcement means comprising at least one bead core made of elastomer or plastomer of greater hardness than the elastomer or plastomer of which said toric safety ring is made, said reinforcement means being circumferentially embedded in the lower portion of said toric safety ring; and
(d) a predetermined amount of lubricant interposed between said toric safety ring and said tubeless vehicle tire,
(e) the width L' being such that:

$$L - 3e \leq L' \leq L - e;$$

(f) the height H' being such that:

$$\frac{H}{2} + 5\% \leq H' \leq \frac{H}{2} + 20\%;$$

(g) the rigidity R being such that:

$$750 \text{ Kg/cm} \leq R \leq 1050 \text{ Kg/cm};$$

(h) the weight of the safety device being between 60% and 70% of the weight of said tubeless vehicle tire.

4. A safety device and a tubeless vehicle tire construction comprising:
   (a) a tubeless vehicle tire which is supported by a rim having a width equal to L, said tubeless vehicle tire having:
     (i) a tread;
     (ii) two side walls;
     (iii) two beads, the thickness of each of which is equal to e;
     (iv) an internal height H; and
     (v) a weight P;
   (b) a toric safety ring made of elastomer or plastomer, said toric safety ring having:
     (i) a rigidity R;
     (ii) a SHORE A hardness d;
     (iii) a weight P';
     (iv) a height H';
     (v) a lower portion and an upper portion; and
     (vi) a width L' at the top of the upper portion, the cross-section of said toric safety ring having a symmetrical configuration with respect to a longitudinal median plane of said tubeless vehicle tire;
   (c) reinforcement means comprising at least one bead core made of elastomer or plastomer of greater hardness than the elastomer or plastomer of which said toric safety ring is made, said reinforcement means being circumferentially embedded in the lower portion of said toric safey ring;
   (d) at least one radial cut which, in combination with the elasticity of the elastomer or of the plastomer of which said toric safety ring is made, permits the deformation of said toric safety ring so as to allow it to penetrate manually, by rotation, into said tubeless vehicle tire;
   (e) at least one inextensible locking member circumferentially engirdling a portion of the upper surface of said toric safety ring, said at least one inextensible locking member being circumferentially disposed on the radially outer surface of said toric safety ring, said at least one inextensible locking member being positioned in a groove formed in the upper portion of the safety device; and
   (f) a predetermined amount of lubricant interposed between said toric safety ring and said tubeless vehicle tire,
   (g) the width L' being such that:

$$L - 3e \leq L' \leq L - e;$$

(h) the height H' being such that:

$$\frac{H}{2} + 5\% \leq H' \leq \frac{H}{2} + 20\%;$$

(i) the rigidity R being such that:

$$750 \text{ Kg/cm} \leq R \leq 1050 \text{ Kg/cm};$$

and
   (j) the weight of the safety device being between 60% and 70% of the weight of said tubeless vehicle tire.

* * * * *